United States Patent
Fehenberger et al.

(10) Patent No.: US 12,250,301 B2
(45) Date of Patent: Mar. 11, 2025

(54) METHOD AND SYSTEM FOR CONTINUOUS-VARIABLE QUANTUM KEY DISTRIBUTION

(71) Applicant: ADVA NETWORK SECURITY GMBH, Berlin (DE)

(72) Inventors: Tobias Fehenberger, Meiningen (DE); Hans Schmiedel, Meiningen (DE)

(73) Assignee: ADVA NETWORK SECURITY GMBH, Berlin (DE)

( * ) Notice: Subject to any disclaimer, the term of this patent is extended or adjusted under 35 U.S.C. 154(b) by 0 days.

(21) Appl. No.: 18/131,693

(22) Filed: Apr. 6, 2023

(65) Prior Publication Data
US 2023/0370255 A1 Nov. 16, 2023

(30) Foreign Application Priority Data
May 11, 2022 (EP) .................................. 22172861

(51) Int. Cl.
*H03M 13/00* (2006.01)
*H04B 10/70* (2013.01)
(Continued)

(52) U.S. Cl.
CPC ........... *H04L 9/0852* (2013.01); *H04B 10/70* (2013.01); *H04L 1/004* (2013.01)

(58) Field of Classification Search
CPC ... H04L 9/0855; H04L 9/0852; H04L 9/0819; H04L 63/061; H04L 9/0838;
(Continued)

(56) References Cited

U.S. PATENT DOCUMENTS 7,697,687 B2 * 4/2010 Liang ....................... H04L 9/12
380/255
7,929,700 B2 4/2011 Lodewyck et al.
(Continued)

FOREIGN PATENT DOCUMENTS

EP 2297896 B1 8/2015

OTHER PUBLICATIONS

European Search Report corresponding to EP Patent Application No. 22172861.1 dated Nov. 4, 2022.
(Continued)

*Primary Examiner* — Esaw T Abraham
(74) *Attorney, Agent, or Firm* — Jenkins, Taylor & Hunt, P.A.

(57) ABSTRACT

The subject matter described herein provides a method and a system for continuous-variable quantum key distribution, CVQKD, between a sender sub-system and a receiver sub-system. The method includes transmitting a quantum key distribution, QKD, signal from a quantum communication transmitter to a quantum communication receiver over a quantum communication channel. The method further includes performing post-processing including forward error correction, FEC as a part of reverse reconciliation between the receiver sub-system and the sender sub-system, where erroneous frames are discarded for key establishment. A value of the reconciliation efficiency, VRE $\beta$, is set to be larger than 1.

15 Claims, 4 Drawing Sheets

(51) Int. Cl.
*H04L 1/00* (2006.01)
*H04L 9/08* (2006.01)

(58) Field of Classification Search
CPC . H04L 2209/24; H04L 63/062; H04L 9/0822; H04B 10/70
See application file for complete search history.

(56) References Cited

U.S. PATENT DOCUMENTS

| | | | | |
|---|---|---|---|---|
| 9,467,284 | B2* | 10/2016 | Dixon | H04L 9/0852 |
| 9,887,976 | B2* | 2/2018 | Hughes | H04L 9/3226 |
| 10,361,848 | B2* | 7/2019 | Gray | H04B 10/516 |
| 10,726,353 | B2* | 7/2020 | Ashrafi | G06N 10/00 |
| 11,170,318 | B2* | 11/2021 | Ashrafi | G02F 3/00 |
| 2004/0109564 | A1 | 6/2004 | Cert et al. | |
| 2006/0256966 | A1* | 11/2006 | Kuang | H04B 10/70 380/256 |

OTHER PUBLICATIONS

Bai et al., "High-efficiency Gaussian key reconciliation in continuous variable quantum key distribution", Science China Physics, Mechanics, vol. 59, No. 1, Beijing, China, vol. 59, No. 1, XP055558883, Dec. 19, 2015.
Elkouss et al., "Rate Compatible Protocol for Information Reconciliation: An application to QKD", Cornell University Library, Ithica, NY, XP080483354, Jun. 14, 2010.
Jouget et al., "Long Distance Continuous-Variable Quantum Key Distribution with a Gaussian Modulation", Cornell University Library, Ithica, NY, XP080530246, pp. 1-8, Oct. 1, 2011.
Mani, Hossein: "Error Reconciliation Protocols for Continuous-Variable Quantum Key Distribution", Lyngby, Denmark, XP055974107, pp. 1-139, Aug. 31, 2020.
Grosshans et al., "Reverse reconciliation protocols for quantum cryptography with continuous variables", Apr. 22, 2002, arXiv:quant-ph/0204127v.
Eriksson, T.A. et al., "Challenges in Coding, DSP and Parallel Operation of Quantum Key Distribution and Coherent Data Transmission," pp. 1-4, 2020.
Grosshans, F. and Grangier, P., "Continuous Variable Quantum Cryptography Using Coherent States," Phys. Rev. Lett., vol. 88, No. 5, p. 057902, Feb. 4, 2002.
K. Gümüş et al., "A novel error correction protocol for continuous variable quantum key distribution," Sci Rep, vol. 11, No. 1, p. 10465, Dec. 2021, doi: 10.1038/s41598-021-90055-3.
S. J. Johnson et al., "On the problem of non-zero word error rates for fixed-rate error correction codes in continuous variable quantum key distribution," New J. Phys. 19 pp. 1-14 (2017) 023003.
Laudenbach et al., "Continuous-Variable Quantum Key Distribution with Gaussian Modulation—The Theory of Practical Implementations," Adv. Quantum Technol., vol. 1, No. 1, p. 1800011, Aug. 2018.
A. Leverrier, "Theoretical study of continuous-variable quantum key distribution," PHD Thesis, 2009.

* cited by examiner

METHOD AND SYSTEM FOR CONTINUOUS-VARIABLE QUANTUM KEY DISTRIBUTION

PRIORITY CLAIM

This application claims the priority benefit of European Patent Application Number 22172861.1, filed May 11, 2022, the disclosure of which is incorporated herein by reference in its entirety.

FIELD OF THE INVENTION

The present invention relates to a method for continuous-variable quantum 1key distribution, CVQKD, and to a system for continuous-variable quantum key distribution, CVQKD.

BACKGROUND OF THE INVENTION

In continuous-variable quantum key distribution, CVQKD, quantum continuous variables, QCV, are used as an alternative to more common single photon quantum key distribution, QKD, schemes. A CVQKD system is described, for example, in U.S. Pat. No. 7,929,700 B2.

As in any other communication system and method, the maximum possible reach (i.e., the efficient range or efficient distance of communication) is a key goal. In CVQKD applications, reach is, among other elements, limited by the post-processing performance. Post-processing includes, for example, a reconciliation step (either direct or indirect reconciliation) and the like. The Ph. D. thesis of H. Mani, for example, titled "Error Reconciliation Protocols for Continuous-Variable Quantum Key Distribution", 31 Aug. 2020, Department of Physics, Technical University of Denmark, describes some known reconciliation protocols for CVQKD. This document deals with the task of finding improved protocols in CVQKD, which provide error-correcting codes with a rate close to the channel capacity, such that the reconciliation efficiency $\beta$ is brought above 0.95 but not exceeding 1.0. The search is restricted to the low signal-to-noise ratio regime, such that operation is conducted under channel capacity, corresponding to $\beta<1$.

In general, a high-performance post-processing scheme is necessary to maximize reach. On the other hand, commonly used field-programmable gate arrays used in communication systems have complexity constraints so that, in general, low complexity is desired. Usually, high performance and low complexity are mutually exclusive requirements for the reconciliation step.

Of particular importance is the secure key rate, SKR. The secure key rate, SKR, is computed, taking a noise level into account, as:

$$SKR = (1-FER)(\beta/(A;B) - S(B;E)) \quad (1)$$

Herein, FER is the frame error rate, $\beta$ is the reconciliation efficiency, and S is the Holevo entropy. / denotes the initially shared information between sender ("Alice", data A) and receiver ("Bob", data B). The Holevo entropy H is dependent on data of the receiver (B) and a potential eavesdropper ("Eve", E).

The reconciliation efficiency $\beta$ is usually calculated as $$\beta = R/C_{Gauss}. \quad (2)$$

Herein, R is the code rate, which indicates a fractional number that expresses what part of a redundant message is actually meaningful and wherein $C_{Gauss}$ is the maximal channel capacity under the assumption that the frame error rate, FER, shall tend to zero.

The reconciliation efficiency $\beta$ may be defined as the ratio of the capacity achieved for a given communication channel. By definition, $\beta \geq 0$. Another measure of the efficiency used in the literature is f, which is defined as a measure of the percentage of additional information disclosed over the Shannon limit. By definition, $f \geq 1$. $\beta$ and f are related as $$\beta = fR/(f+R-1). \quad (3)$$

Here and in the following, whenever reference is made to a reconciliation efficiency (or its value), always the reconciliation efficiency $\beta$ will be meant.

One known reconciliation scheme is so-called reverse reconciliation. In such a scheme, instead of the receiver of a quantum communication trying to guess what was sent by the sender, here the sender is trying to guess what was received by the receiver. Since the sender has additional information what was sent, the sender will always be able to guess better than a potential eavesdropper. Reverse reconciliation is described, for example, in F. Grosshans and P. Grangier, "Reverse reconciliation protocols for quantum cryptography with continuous variables", arXiv:quant-ph/0204127v1 of Apr. 22, 2002, hereafter cited as "Grosshans et al.".

In order to increase the secure key rate, SKR, that is, in order to increase the number of secure keys that are generated per time unit, in the prior art it is a fundamental paradigm to maximize the value of the reconciliation efficiency $\beta$ and to minimize the frame error rate, FER. It is evident from the above formulae how this results in a large secure key rate, SKR. However, a consequence from this fundamental paradigm are ultra-long codes and therefore a high decoding complexity.

The above restrictions have hampered, in the prior art, endeavors to increase the reach of CVQKD methods and systems.

SUMMARY OF THE INVENTION

It is an objective of the present invention to provide a method and a system for continuous-variable quantum key distribution, CVQKD, in particular with improved reach, i.e. distance. These objectives are fulfilled by the subject matter of the independent claims.

Therefore, according to a first aspect, the present invention provides a method for continuous-variable quantum key distribution, CVQKD, between a sender sub-system and a receiver sub-system. The method comprises at least the steps of:

transmitting a quantum key distribution, QKD, signal from a quantum communication transmitter to a quantum communication receiver over a quantum communication channel; and performing post-processing including forward error correction, FEC as a part of reverse reconciliation between the receiver sub-system and the sender sub-system, wherein erroneous frames are discarded for key establishment. A value of the reconciliation efficiency, VRE $\beta$, is set to be larger than 1.

VRE $\beta$ can be set larger than 1, for instance, by using an error correction code whose rate is larger than the mutual information between the sender (Alice) and the receiver (Bob).

Erroneous frames occur with a frequency that is designated as the frame error rate, FER, and usually a multitude of incorrect frames is discarded during key distribution (or: key establishment).

One of the key concepts of the invention is that the technical parameters of the method and the system for CVQKD are set such that the value of the reconciliation efficiency, VRE β, is set to be larger than 1. As mentioned in the foregoing, in the paradigm of CVQKD of the prior art, this is counter-intuitive: increasing the reconciliation efficiency, VRE β, to be larger than 1 means, looking at the formula (2) for the VRE β cited above, that a non-optimal channel capacity is used (such that R>C) with $C \neq C_{Gauss}$. This in turn means that the frame error rate, FER, will not be (able to be) prioritized to approximate zero. In this manner the mutual dependency of the value of the reconciliation efficiency, VRE β, on the one hand and the frame error rate, FER, can be intuitively understood.

It has now been found by the inventor that, by observing the physical properties of the channels used for communication and by setting the technical parameters of the method or system accordingly, a trade-off allowing a higher frame error rate, FER, by operating beyond the channel limit (VRE β>1) results in a surprising increase in reach. Another important and surprising observation in this context is that a high frame error rate, FER, is not necessarily detrimental to the overall efficiency of the method; what is important is that the secure key rate, SKR, is large enough for the intended purpose.

Preferably, VRE β>1.1, more preferably VRE β>1.2, still more preferably VRE β>1.3, for example VRE β=1.4. The frame error rate, FER, may be larger than 75%, preferably larger than 90%, more preferably larger than 95%, e.g. 99% or larger.

Here and in the following, for some (especially longer) terms abbreviations (such as "FER" for "frame error rate" or "VRE" for "value of the reconciliation efficiency") are used. Usually, the terms will be given followed by the corresponding abbreviations. In some cases, to improve legibility, only the abbreviation will be used, whereas in other cases only the term itself will be used. In all cases, the term itself and the corresponding abbreviation shall be understood to be equivalent.

Further technical considerations, advantages as well as variants and refinements are presented in the following, in particular in the dependent claims as well as in the specification with respect to the drawings and the drawings themselves.

In some advantageous embodiments, variants or refinements of embodiments, the method further comprises steps of:
determining a signal-to-noise ratio, SNR, of the quantum communication channel, and adapting the value of the reconciliation efficiency, VRE β, based on the determined SNR while maintaining the VRE β to be larger than 1. As is known, the channel capacity C can, for example, be written as:

$$C = \log_2(1+\text{SNR}) \quad (3)$$

Thus, the signal-to-noise ratio, SNR, of the quantum communication channel, directly influences the capacity and as such, according to formula (1) above, also the VRE β. The VRE β can be kept constant or may be adapted to varying values, as long as VRE β>1 at all times. This can be achieved, as mentioned in the foregoing, by choosing an error correction code whose rate is larger than the mutual information between Alice and Bob. Such adaptation of the VRE β allows the method to be at all times optimized for the specific condition and status of the communication network used, in particular of the quantum communication channel. One parameter to be kept constant may be the reach of the quantum communication.

In some advantageous embodiments, variants or refinements of embodiments, determining the signal-to-noise ratio, SNR, and/or adapting the value of the reconciliation efficiency, VRE β, is performed automatically when a predefined criterion is met. Such a criterion may be, for example, a change in the SNR larger than a predefined absolute or relative change threshold, a control signal received which indicates that the determining of the SNR and/or the adapting of the VRE β are to be performed, and/or the like.

In some advantageous embodiments, variants or refinements of embodiments, determining the signal-to-noise ratio, SNR, and/or the adapting of the value of the reconciliation efficiency, VRE β, are performed regularly automatically. This may be done alternatively or even in addition to the aforementioned performing of the determining and/or the adapting when the predefined criterion is met. Regularly determining the SNR and/or adapting the VRE β has the advantage that the conditions for the method can be kept optimal.

In some advantageous embodiments, variants or refinements of embodiments, the adapting of the value of the reconciliation efficiency, VRE β, comprises setting a code rate R=k/N of the forward error correction, FEC, by selecting a linear coding scheme out of a given list of linear coding schemes. The linear coding schemes in the given list of linear coding schemes may differ, among other elements, for example, in the code rate R (specifically, in the number of message bits k, or the number of total code bits N), in applied protocols, pilot symbols and/or the like. For example, linear coding schemes with low-density parity check, LDPC, may be applied. For example, in order to adapt the VRE β, the linear coding scheme used may be changed, and optionally in addition other parameters may be adapted.

In some advantageous embodiments, variants or refinements of embodiments, the list of linear coding schemes comprises or consists of, linear coding schemes with a block length N≤10,000, preferably N≤6,000, more preferably N≤3,000, most preferably N≤1,000. It has been found by the inventor that, given constant code rate R, the usage of comparatively small block lengths N as indicated above leads to a comparatively high frame error rate, FER, at high signal-to-noise ratios. Conversely, in the domain of lower SNR, the frame error rate, FER, approaches 1 more slowly than desired in the prior art—but importantly not in a way that is detrimental for the method (or the system) according to the present invention. Therefore, said comparatively small block lengths N≤10,000 allow longer reach without any of the disadvantages that have consistently been expected in the prior art with respect thereto.

In some advantageous embodiments, variants or refinements of embodiments, the method further comprises providing a desired secure key rate value, SKRV. This SKRV can come from a high level program and may, for example, be provided based on a user input, based on listed requirements of a specific communication task and/or the like. The adapting of the value of the reconciliation efficiency, VRE β, is preferably carried out also based on the provided desired secure key rate value, SKRV. It has been found by the inventor that the complex interplay between VRE β and frame error rate, FER, in the case of β>1 means that methods with higher FER and higher β have longer reach but start with a lower SKR as a function of loss. Given a specific desired secure key rate value, SKRV, allows, if the range (or conversely, the loss) of the intended communication is known, to optimally select the value for the reconciliation efficiency, VRE β, and/or a particular linear coding scheme out of the given list of linear coding schemes.

In some advantageous embodiments, variants or refinements of embodiments, the method further comprises:
determining a signal-to-noise ratio, SNR, of the QKD signal transmitted over the quantum communication channel and, if the determined SNR is larger than a predetermined target SNR:
adding a noise signal to a forward error correction, FEC, signal to be transmitted over the classical communication channel during reverse reconciliation, said signal being based on the QKD signal, such as to set an actual SNR to the predetermined target SNR. The noise signal may, for example, be an additive white Gaussian noise, AWGN ("noise loading"), and/or by adapting the code rate $R=k/N$. The noise is added in the receiver sub-system to the FEC signal which is sent over the classical channel to the sender sub-system for the reverse reconciliation procedure. The determining of the SNR may, for example, comprise determining a loss level of the QKD signal and/or determining a noise level of the QKD signal.

The reason is that any specific system or method is usually calibrated and fine-tuned for a specific quantum communication channel, which however, may degrade over time. Reducing the loss level is usually not feasible. Instead, according to the present invention, a deliberately high loss level is selected for the calibration (or: fine-tuning, or: setting) of the parameters of the method (value of the reconciliation efficiency, VRE β, code rate R, and so on), in particular a higher loss level than the quantum communication channel exhibits at the time of the calibration. The deterioration over time of the quantum communication channel is taken care of by (ideally concurrently) reducing the amount or level of the added noise signal, ideally such that the current lost level is maintained constant and at the same level that has been used for the initial calibration.

Moreover, according to a second aspect of the present invention, a system for continuous-variable quantum key distribution, CVQKD, between a sender sub-system and a receiver sub-system is provided. The system comprises a quantum communication transmitter, a quantum communication channel and a quantum communication receiver. The quantum communication transmitter is configured to transmit a quantum key distribution, QKD, signal to the quantum communication receiver over the quantum communication channel.

The system also comprises a control device configured to perform post-processing including forward error correction, FEC, as a part of reverse reconciliation between the receiver sub-system and the sender sub-system, wherein erroneous frames are discarded for key establishment.

The system is configured such that a value of the reconciliation efficiency, VRE β, is set to be larger than 1.

The system according to any embodiment of the second aspect of the present invention, in particular the control unit thereof, can be adapted according to any embodiments, variants or refinements of embodiments or any other options or modifications described herein with respect to the method according to the first aspect of the present invention and vice versa. This means that the control unit is advantageously configured to perform the method according to any embodiment of the first aspect of the present invention with the remaining hardware of the communication system.

According to a third aspect, the invention provides a computer program product comprising executable program code configured to, when executed, perform the method according to any embodiment of the first aspect of the present invention.

According to a fourth aspect, the invention provides a non-transient computer-readable data storage medium comprising executable program code configured to, when executed, perform the method according to any embodiment of the first aspect of the present invention.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick or the like.

According to a fifth aspect, the invention provides a data stream comprising, or configured to generate, executable program code configured to, when executed, perform the method according to any embodiment of the first aspect of the present invention.

BRIEF DESCRIPTION OF THE DRAWINGS

The invention will be explained in greater detail with reference to exemplary embodiments depicted in the drawings as appended.

The accompanying drawings are included to provide a further understanding of the present invention, are incorporated in, and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts. The numbering of method steps is done for the purpose of distinguishing between them and does not necessarily imply a temporal order although a temporal order according to the numbering is possible. In particular, one or more method steps may be performed at the same time, overlapping one another and/or the like.

In the figures.

DETAILED DESCRIPTION OF THE DRAWINGS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
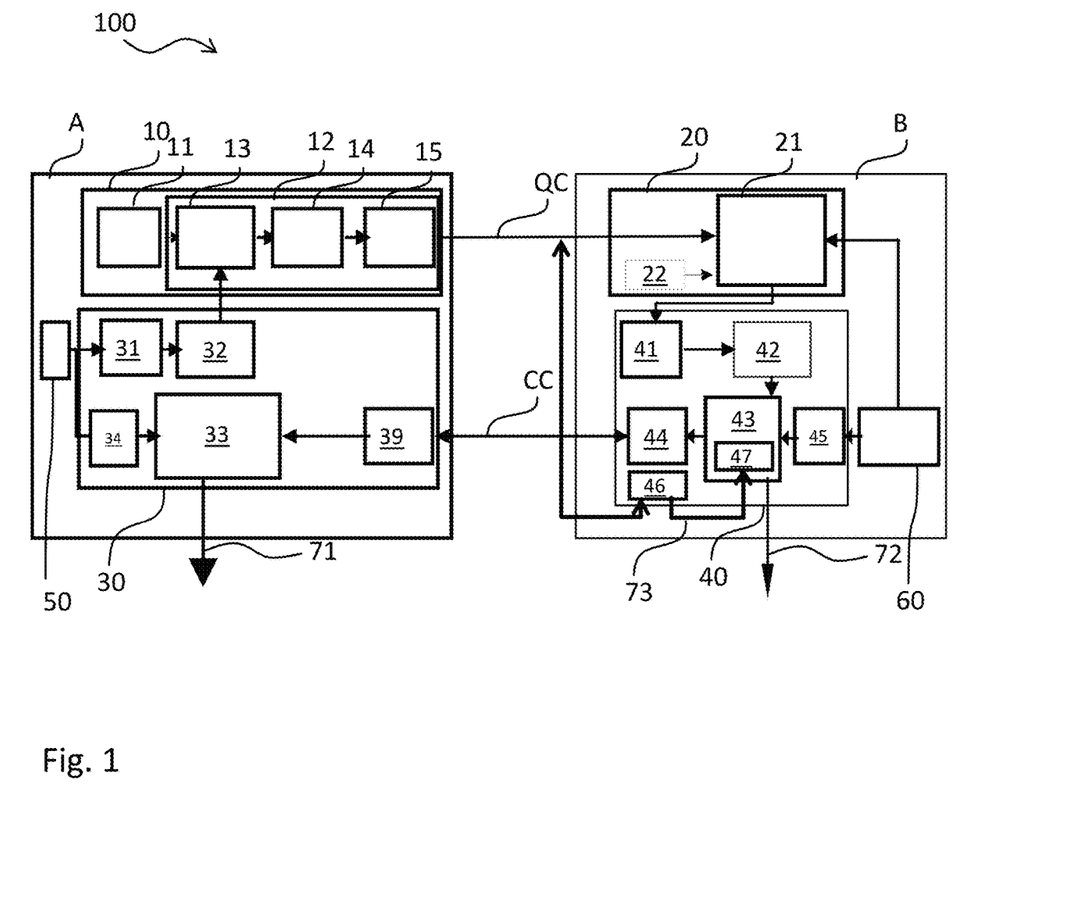
FIG. 1 shows a schematic block diagram illustrating a system for continuous-variable quantum key distribution, CVQKD, according to an embodiment of the second aspect of the present invention.

FIG. 1 shows a schematic block diagram illustrating a system 100 for continuous-variable quantum key distribution, CVQKD, according to an embodiment of the present invention.

FIG. 1 shows, on the left-hand side a sender sub-system A of the sender ("Alice") and on the right-hand side a receiver sub-system B of the receiver ("Bob"). The system 100 comprises at least a quantum communication transmitter, QTx 10, a quantum communication channel QC and a quantum communication receiver, QRx 20. Over the quantum communication channel QC, coherent light signals are transmitted from the quantum communication transmitter, QTx 10, to the quantum communication receiver, QRx 20. It shall be understood that also the receiver ("Bob") may comprise its own sender sub-system, and also the sender ("Alice") of the original message may have access to a sender sub-system.

The quantum communication transmitter, QTx 10, comprises a laser source 11 configured to generate laser light, i.e., coherent light which is guided through an optical apparatus 12 comprising, in this order, an coherent driver modulator 13, an attenuator 14 and an isolator 15, before being inserted into the quantum channel QC.

The sender sub-system A also comprises a sender quantum random number generator, SQRNG 50, configured to generate quantum random numbers. The generated quantum random numbers are provided to a sender control unit 30 of the sender sub-system A. The sender control unit 30 comprises a sender digital signal processing module, TxDSP 31, which performs the usual signal processing (known in the prior art) and provides the result to a digital to analog converter, DAC 32. The analog converter, DAC 32, provides an analog signal to the coherent driver modulator 13, which imprints the signal onto the coherent light signal. In this way, the coherent light is transformed into a quantum key distribution, QKD, signal to be transmitted over the quantum channel QC to the receiver sub-system B.

Although here, in the foregoing and in the following, some functions are described as being performed by modules, it shall be understood that this does not necessarily mean that such modules are provided as entities separate from one another. In cases where one or more modules are provided as software, the modules may be implemented by program code sections or program code snippets which may be distinct from one another but which may also be interwoven.

Similarly, in case where one or more modules are provided as hardware, they functions of one or more modules may be provided by one and the same hardware component, or the functions of one module or the functions of several modules may be distributed over several hardware components which need not necessarily correspond to the modules one-to-one. Thus, any apparatus, system, method and so on which exhibits all of the features and functions ascribed to a specific module shall be understood to comprise, or implement, said module.

In particular, it is a possibility that all modules are implemented by program code executed by a computing device, e.g., a server or a cloud computing platform.

The sender control unit 30 also comprises a sender post-processing module 33 which also receives the random numbers generated by the sender quantum random number generator, SQRNG 50, for example from an intermediate random access memory, RAM, storage 34. Over a digital input/output interface 39 of the sender control unit 30, the sender post-processing module 33 will later receive a classical signal via a classical communication channel CC for the required post-processing, in particular the reverse reconciliation scheme. An output signal 71 of the sender post-processing module 33 may then be output to a key interface, for example, a software application that makes use of the generated keys for a secure classical communication.

On the side of the receiver sub-system B, the quantum communication receiver, QRx 20 (or: optical receiver) comprises a coherent receiver 21, in particular a low-noise coherent receiver. The quantum communications receiver, QRx 20, also comprises a local oscillator laser 22 with which the received signal is mixed.

The analog coherent light signal received with the coherent receiver 21 is transmitted to an analog to digital converter, ADC 41, of a receiver control unit, 40 of the receiver sub-system B.

Each control unit 30, 40 may also be realized as any device, or any means, for computing, in particular for executing a software, an app, or an algorithm. For example, the control unit 30 and/or the control unit 40 may each comprise at least one processing unit such as at least one central processing unit, CPU, and/or at least one graphics processing unit, GPU, and/or at least one field-programmable gate array, FPGA, and/or at least one application-specific integrated circuit, ASIC and/or any combination of the foregoing. The control unit 30 and/or the control unit 40 may each further comprise a working memory operatively connected to the at least one processing unit (such as the RAM storage described or in addition to it) and/or a non-transitory memory operatively connected to the at least one processing unit and/or the working memory. Each element, part, or module, of each of the control units 30, 40 may be realized completely or partially in software and/or completely or partially in hardware.

From the ADC 41, the signal is transmitted to a receiver digital signal processing module, RxDSP 42 of the receiver control unit 40 which performs the usual post-processing (known in the prior art). The post-processed signal is then transferred to a receiver post-processing module 43, which is also connected to a digital input/output interface 44 of the receiver control unit 40. Between the digital input/output interface 39 of the sender control unit 30 and the digital input/output interface 44 of the receiver control unit 40, the classical communication channel CC is arranged to transmit messages bidirectionally.

The sender control unit 30 and the receiver control unit 40 together can be designated as a control device of the system 100.

Also the receiver sub-system B comprises a receiver quantum random number generator 60 which is configured to generate quantum random numbers and to provide them to the coherent receiver 21 and to the receiver control unit 40, where they may be intermediately stored in a random access memory, RAM 45, for use by the receiver post-processing module 43. At the end of the process, the receiver post-processing module 43 generates an output signal 72 comprising the one or more generated secure keys for use by "Bob".

The sender and receiver post-processing modules 33, 43 perform post-processing including forward error correction, FEC, by as a part of reverse reconciliation between the receiver sub-system B comprising the quantum communication receiver, QRx 20, and the sender sub-system A comprising the quantum communication sender, QTx 10, wherein erroneous frames are discarded for key establishment. The value of the reconciliation efficiency, VRE β, is set to be larger than 1, for example to 1.4.

The receiver control unit 40, specifically the post-processing module 43, of the receiver sub-system B may comprise a noise generating unit 47 configured to generate a noise signal with defined parameters, to be added, in the course of the reverse reconciliation, to the QKD signal that has been transmitted over the quantum communication channel QC, for transmission of a forward error correction, FEC signal over the classic channel CC from quantum receiver B to quantum sender A. Since this noise signal is added at the quantum receiver B in the digital domain with known properties, it may also be designated as a "trusted noise". Specifically, the noise generating unit 47 may be configured to provide a selectable level (or: amount) of noise, in particular for the following purpose:

As has been described in the foregoing, and/or as detailed in the following with respect to FIG. 2, the noise (e.g., an added white Gaussian noise, AWGN) may be added in order to purposefully set a signal-to-noise ratio, SNR to a predetermined target SNR. The target SNR may be an SNR for which one or more parameters of the system 100 have been optimized. For example, the target SNR may correspond to a channel capacity chosen such that, in combination with a predefined code rate R, the VRE β is set to a predefined desired value, said value being larger than 1.

The noise generating unit 47 may receive a control signal 73 indicating an actual loss and/or noise, or actual SNR of the QKD signal received via the quantum communication channel QC and may be configured to output its noise signal such that the forward error correction, FEC, signal transmitted over the classical communication channel CC for reverse reconciliation remains at the target SNR. The control signal 73 indicating an SNR may be generated by a SNR determining device 46 of the receiver sub-system 10. The SNR determining device 46 may be configured to determine a loss of the quantum communication channel QC and/or a noise of the QKD signal received via the quantum communication channel QC.

The control device 30, 40, of the system 100, in particular the sender control unit 30 and/or the receiver control unit 40, may be configured to perform (or control the system 100 to perform) the method according to any of the embodiments of the method according to the first aspect of the present invention. One such embodiment is described with respect to FIG. 2 in the following. However, it shall be understood that the control device 30, 40 may also be configured to perform any other embodiment of the method.

Figure 2:
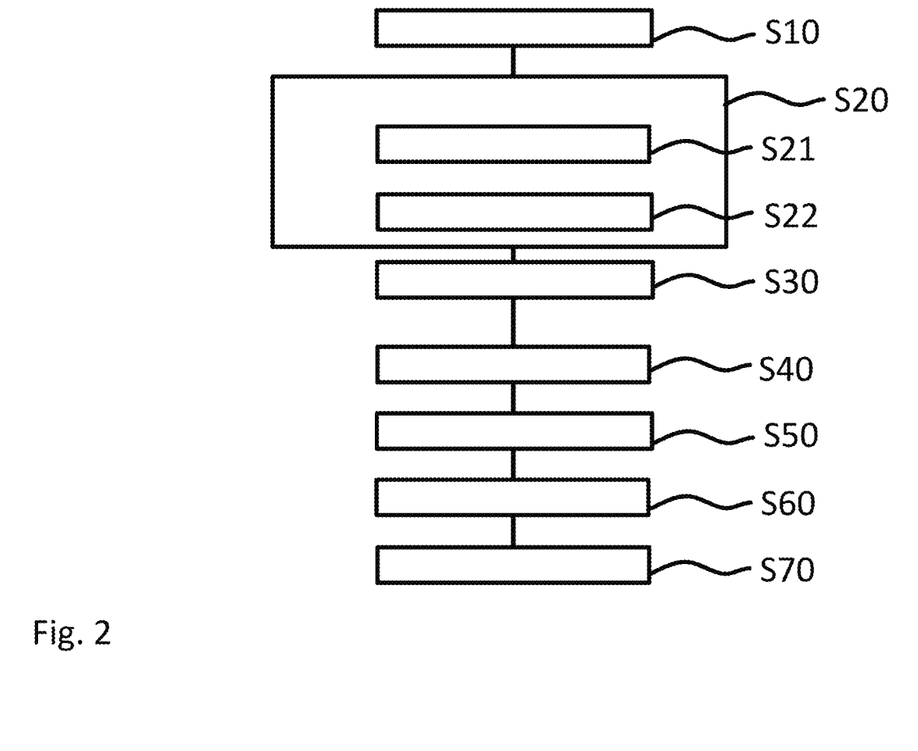
FIG. 2 shows a flow diagram schematically illustrating a method according to an embodiment of the first aspect of the present invention.

FIG. 2 shows a flow diagram schematically illustrating a method according to an embodiment of the first aspect of the present invention.

In step S10, a quantum key distribution, QKD, signal is transmitted from a quantum communication transmitter, QTx 10, to a quantum communication receiver, QRx 20, over a quantum communication channel QC.

In step S20, post-processing is performed. As part of the post-processing S20, a reverse reconciliation S21 is performed between the receiver sub-system B comprising the quantum communication receiver, QRx 20, and the sender sub-system A comprising the quantum communication sender, QTx 10, wherein erroneous frames are discarded for key establishment.

Reverse reconciliation may be performed e.g. as has been described in the "Grosshans et al." publication. In particular, the reverse reconciliation comprises forward error correction, FEC S22. According to one of the main ideas of the present invention, a value of the reconciliation efficiency, VRE β, is set to be larger than 1. In other words, parameters of the method such as the code rate R, noise added to the signal and/or the like are automatically chosen such that VRE β>1.

The method may further comprise step S30 of determining a signal-to-noise ratio, SNR, of the QKD signal received via the quantum communication channel, QC, and adapting S40 the value of the reconciliation efficiency, VRE β, based on the determined SNR while maintaining the VRE β to be larger than 1. In some variants, determining S30 the SNR and adapting the VRE β is performed automatically when a predefined criterion is met. In other variants, determining S30 the SNR and adapting the VRE β is performed regularly automatically. For both variants, in the foregoing several options have been discussed which may be applied here and which may be selected according to the specific communication task at hand.

The adapting S40 of the VRE β may comprise setting S41 a code rate of the FEC by selecting a linear coding scheme out of a given list of linear coding schemes. For example, the list of linear coding schemes comprises or consists of, linear coding schemes with a block length N≤10,000, preferably N≤6,000, more preferably N≤3,000, most preferably N≤1,000. The list may also comprise linear coding schemes with different code rates R, and preferably for each code rate R a sub-list of different linear coding schemes with different block lengths N.

In an optional step S50, a desired secure key rate value, SKRV, is provided. The adapting S40 of the VRE β is then preferably carried out also based on the provided desired secure key rate value, SKRV.

In an optional step S60, for determining S30 the SNR of the QKD signal received via the quantum communication channel QC, a loss level and a noise level are determined. For example, this may be done by the SNR determining device 46 as has been described in the foregoing. In case the current SNR is determined, in step S30, to be larger than a predetermined target SNR, then, in a step S70, a noise signal is added to the FEC signal to be transmitted from the receiver sub-system B to the sender sub-system A over the classical channel CC during reverse reconciliation. The addition S70 of the noise signal is done in order to raise the current SNR to the predetermined target SNR. The noise signal may be, for example, an added white Gaussian noise, AWGN, and/or may be effected by adapting the code rate R. The adding may be performed by the noise generating unit 47 as described in the foregoing.

Figure 3:
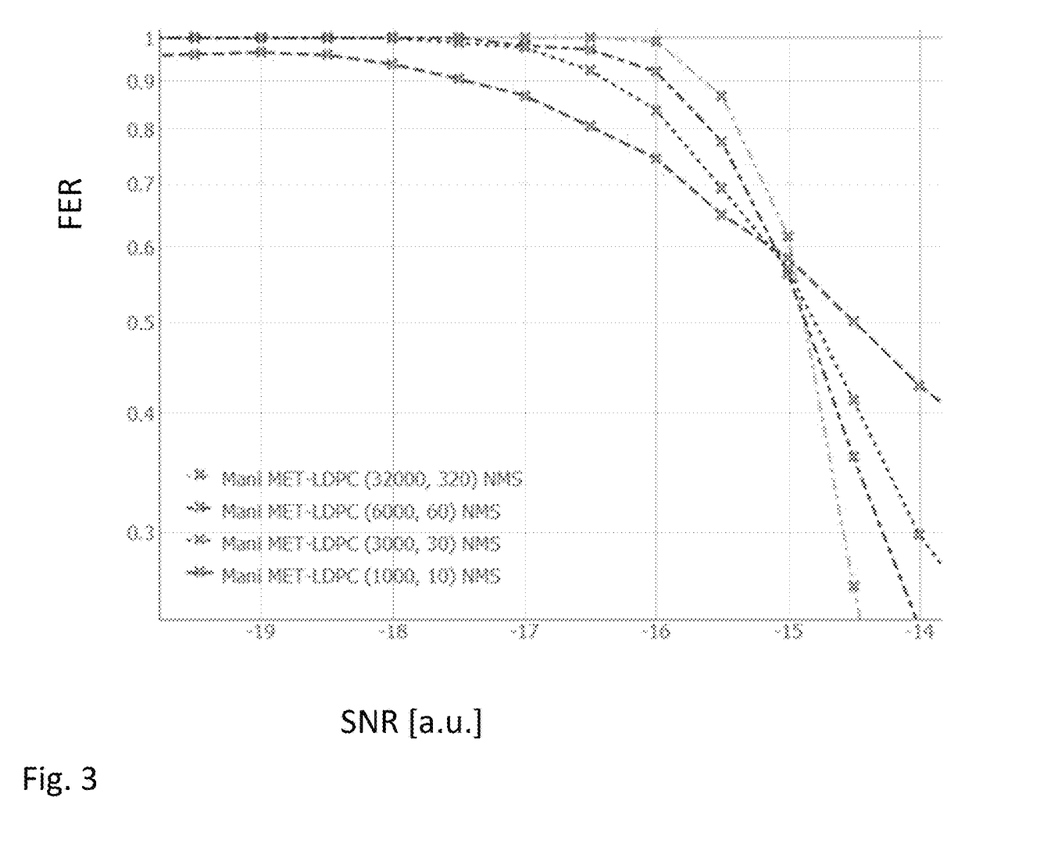
FIG. 3 and FIG. 4 show graphs illustrating considerations for the present invention.

FIG. 3 shows a graph illustrating the forward error rate, FER (vertical axis) as a function of the signal-to-noise ratio (horizontal axis) for different linear coding schemes of the category multi-edge-type low-density parity check (MET-LDPC), specifically as described by H. Mani for example in his Ph. D. Thesis titled "Error Reconciliation Protocols for Continuous-Variable Quantum Key Distribution" or in related scientific publications such as the scientific publication by P. Jouguet, S. Kunz-Jacques, and A. Leverrier, "Long Distance Continuous-Variable Quantum Key Distribution with a Gaussian Modulation," Phys. Rev. A, vol. 84, no. 6, p. 062317, December 2011, doi: 10.1103/PhysRevA.84.062317, the contents of both of which are incorporated herein by reference. The values in parentheses denote (N, k).

Accordingly, all depicted linear coding schemes have a code rate of R=0.01. Moreover, all use the normalized min sum algorithm, NMS. In general, all coding schemes show the behavior that for low SNR (i.e. a very noisy channel) the frame error rate, FER, is quite high, and conversely for high SNR the frame error rate, FER, starts to drop quickly. In the prior art paradigm of desired low FER and VRE $\beta<1$, coding schemes with high N would have been preferred because of their efficient drop-off to zero. However, for the present invention, a drop-off to zero of the FER is not necessary as the trade-off between FER<1 and VRE $\beta>1$ is utilized to increase the reach of the communication.

Despite all coding schemes having the same code rate of R=0.01 and being all of the same type, it is evident that coding schemes with comparatively lower block number N tend to have a lower FER for lower SNR, which is advantageous, than coding schemes with comparatively higher block number N. On the side of high SNRs, the aforementioned trade-off takes place.

Figure 4:
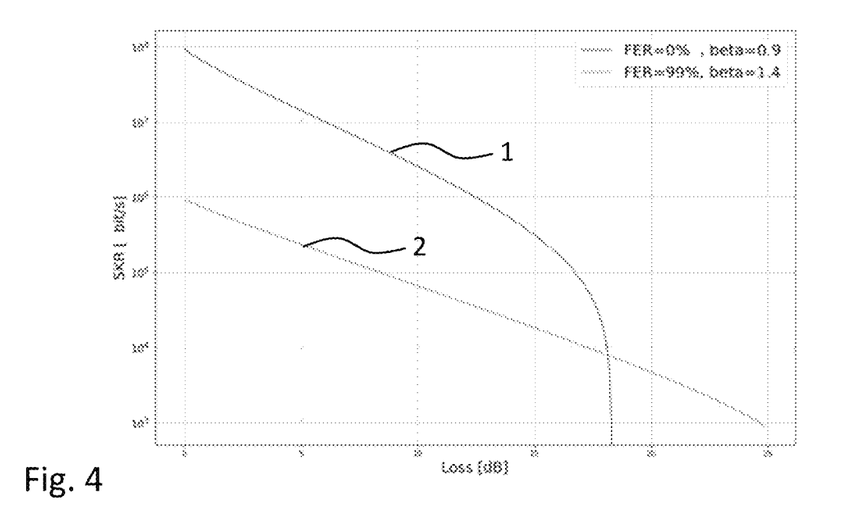

FIG. 4 shows a schematic graph illustrating in an exemplary fashion how the secure key rate, SKR, in bit/s behaves as a function of a loss in decibel, dB. Because of the increasing loss with increasing distance of communication, the loss here can be associated with the reach of the communication. A first curve 1 shows the conventional situation according to the prior art, wherein the FER is 0% and the VRE $\beta$ is strictly smaller than 1 (here: VRE $\beta=0.9$). At a loss of (in this example) about 18 dB, the SKR goes to 0.

By contrast, a second curve 2 shows the situation according to the methods and systems according to the present invention, with VRE $\beta$ strictly larger than 1 (here: VRE $\beta=1.4$), and, correspondingly, a comparatively high frame error rate FER of about 99%. FIG. 4 illustrates that the overall value for the SKR is lower for smaller losses, it is longer larger than zero for higher losses, thus increasing reach. Each point on each of the curves is specifically reachable by a particular set of parameters/properties of the system, in particular including a linear coding scheme, a coding rate R, a block rate N and the like.

As has been described in the foregoing, a target value for the loss ("target loss value") used during setup, calibration or fine-tuning may be taken as larger than a current loss of the communication channels used. Then, in order to ensure that the actual communication happens at the desired, i.e. selected, point of the SKR curve, an additional (e.g. artificial) noise may be added to the communication, for example by the noise generating unit 35 as described above.

Figure 5:
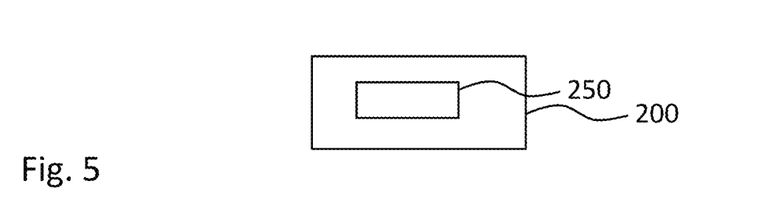
FIG. 5 shows a schematic block diagram of a computer program product according to an embodiment of the third aspect of the present invention.

FIG. 5 shows a schematic block diagram illustrating a computer program product 200 according to an embodiment of the third aspect of the present invention. The computer program product 200 comprises executable program code 250 configured to, when executed, perform the method according to any embodiment of the first aspect of the present invention, in particular as has been described with respect to the preceding figures.

Figure 6:
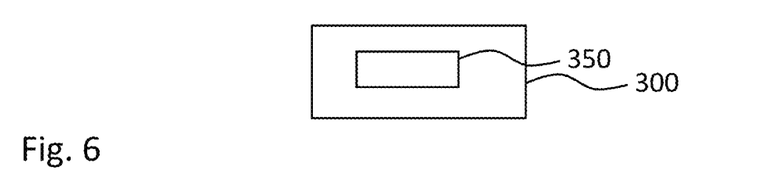
FIG. 6 shows a schematic block diagram of a data storage medium according to an embodiment of the fourth aspect of the present invention.

FIG. 6 shows a schematic block diagram illustrating a non-transitory computer-readable data storage medium 300 according to an embodiment of the fourth aspect of the present invention. The data storage medium 300 comprises executable program code 350 configured to, when executed, perform the method according to any embodiment of the first aspect of the present invention, in particular as has been described with respect to the preceding figures.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated.

LIST OF REFERENCE SIGNS 1 curve of secure key rate, SKR, according to prior art
2 curve of secure key rate, SKR, according to embodiments
10 quantum communication transmitter
11 laser source
12 optical apparatus
13 coherent driver modulator
14 attenuator
15 isolator
20 quantum communication receiver
21 coherent receiver
22 local oscillator laser
30 sender control unit, part of control device
31 transmitter digital signal processing module, TxDSP
32 digital-to-analog converter, DAC
33 sender post-processing module
34 random access memory, RAM, storage
39 sender input/output interface
40 receiver control unit, part of control device
41 analog-to-digital converter, ADC
42 receiver digital signal processing module, RxDSP
43 receiver post-processing module
44 receiver input/output interface
45 random access memory, RAM, storage
46 SNR determining device
47 noise generating unit
50 sender quantum random number generator, SQRNG
60 receiver quantum random number generator, RQRNG
71 output signal
72 output signal
73 control signal
100 system
200 computer program product
250 program code
300 data storage medium
350 program code
A sender sub-system
B receiver sub-system
QC quantum communication channel
CC classical communication channel
S10 . . . S70 method steps

The invention claimed is:
1. A method for continuous-variable quantum key distribution, CVQKD, between a sender sub-system and a receiver sub-system; the method comprising at least the steps of:
transmitting a quantum key distribution, QKD, signal from a quantum communication transmitter to a quantum communication receiver over a quantum communication channel;
performing post-processing including forward error correction, FEC, as a part of reverse reconciliation between the receiver sub-system and the sender sub-system, wherein erroneous frames are discarded for key establishment the reverse reconciliation is performed with a reconciliation efficiency, VRE p,
characterized in that
a value of the reconciliation efficiency, VRE p, is set to be larger than 1.

2. The method of claim 1,
further comprising:
determining a signal-to-noise ratio, SNR, of the quantum communication channel, and adapting the value of the reconciliation efficiency, VRE β, based on the determined SNR while maintaining the VRE β to be larger than 1.

3. The method of claim 2,
wherein determining the SNR and/or adapting the VRE β are performed automatically when a predefined criterion is met.

4. The method of claim 2,
wherein determining the SNR and/or adapting the VRE β are performed regularly automatically.

5. The method of claim 2,
wherein the adapting of the VRE β comprises setting a code rate of the FEC by selecting a linear coding scheme out of a given list of linear coding schemes.

6. The method of claim 5,
wherein the list of linear coding schemes comprises, or consists of, linear coding schemes with a block length $N \leq 10000$.

7. The method of claim 2,
further comprising:
providing a desired secure key rate value;
wherein the adapting of the VRE β is carried out also based on the provided desired secure key rate value.

8. The method of claim 1,
further comprising:
determining a signal-to-noise ratio, SNR, of the QKD signal transmitted via the quantum communication channel and, if the determined SNR is larger than a predetermined target SNR,
adding a noise signal to a forward error correction, FEC, signal to be transmitted during reverse reconciliation over a classical communication channel such as to set the actual SNR to the predetermined target SNR.

9. A system for continuous-variable quantum key distribution, CVQKD, between a sender sub-system and a receiver sub-system, the system comprising:
a quantum communication transmitter, a quantum communication channel and a quantum communication receiver, the quantum communication transmitter being configured to transmit a quantum key distribution, QKD, signal to the quantum communication receiver over the quantum communication channel; and
a control device configured to:
perform post-processing including forward error correction, FEC, as a part of reverse reconciliation between the receiver sub-system and the sender sub-system, wherein erroneous frames are discarded for key establishment the reverse reconciliation is performed with a reconciliation efficiency, VRE p,
characterized in that
a value of the reconciliation efficiency, VRE p, is set to be larger than 1.

10. The system of claim 9,
wherein the control device is further configured to:
determine a signal-to-noise ratio, SNR, of the quantum communication channel; and
adapt the value of the reconciliation efficiency, VRE β, based on the determined SNR while maintaining the VRE β to be larger than 1.

11. The system of claim 10,
wherein the control device is further configured to determine the SNR and adapt the VRE β automatically when a predefined criterion is met.

12. The system of claim 10,
wherein the control device is further configured to determine the SNR and adapt the VRE β regularly automatically.

13. The system of claim 9,
wherein the adapting of the VRE β by the control device comprises setting a code rate of the FEC by selecting a linear coding scheme out of a given list of linear coding schemes.

14. Computer program product comprising executable program code configured to, when executed, perform the method according to claim 1.

15. Non-transitory, computer-readable data storage medium comprising executable program code configured to, when executed, perform the method according to claim 1.

* * * * *